(12) United States Patent
Shuck et al.

(10) Patent No.: US 11,745,264 B2
(45) Date of Patent: Sep. 5, 2023

(54) FUSED FILAMENT FABRICATION OF THERMAL MANAGEMENT ARTICLE

(71) Applicants: Rolls-Royce Corporation, Indianapolis, IN (US); Rolls-Royce North American Technologies, Inc., Indianapolis, IN (US)

(72) Inventors: Quinlan Yee Shuck, Indianapolis, IN (US); Scott Nelson, Carmel, IN (US); Raymond Ruiwen Xu, Carmel, IN (US); Brandon David Ribic, Noblesville, IN (US); Matthew R. Gold, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 273 days.

(21) Appl. No.: 17/097,924

(22) Filed: Nov. 13, 2020

(65) Prior Publication Data
US 2021/0370399 A1    Dec. 2, 2021

Related U.S. Application Data

(60) Provisional application No. 62/935,531, filed on Nov. 14, 2019.

(51) Int. Cl.
*B22F 10/18*    (2021.01)
*B64G 1/58*    (2006.01)
(Continued)

(52) U.S. Cl.
CPC ............ *B22F 10/18* (2021.01); *B22F 3/1003* (2013.01); *B33Y 10/00* (2014.12); *B33Y 30/00* (2014.12);
(Continued)

(58) Field of Classification Search
CPC ...... B22F 10/18; B22F 3/1003; B22F 3/1021; B22F 10/64; B22F 7/08; B33Y 10/00;
(Continued)

(56) References Cited

U.S. PATENT DOCUMENTS

| 4,602,679 A | 7/1986 | Edelstein et al. |
| 7,028,760 B2 | 4/2006 | Dussinger et al. |

(Continued)

FOREIGN PATENT DOCUMENTS

| EP | 3363563 A1 | 8/2018 |
| EP | 34707365 A1 | 4/2019 |
| WO | 2018067918 A2 | 4/2018 |

OTHER PUBLICATIONS

U.S. Appl. No. 17/097,843, filed Nov. 13, 2020, by Shuck et al.
(Continued)

*Primary Examiner* — Lawrence Averick
(74) *Attorney, Agent, or Firm* — Shumaker & Sieffert, P.A.

(57) ABSTRACT

In some examples, an additive manufacturing technique including forming an as-deposited coating on a substrate by depositing a filament via a filament delivery device, wherein the filament includes a sacrificial binder and a powder; removing substantially all the binder from the as-deposited coating; and sintering the as-deposited coating to form a thermal coating; wherein the thermal coating is configured to ablate in response to absorption of energy from an external environment, and wherein the ablation of the thermal coating reduces the energy transferred to the substrate.

6 Claims, 5 Drawing Sheets

(51) Int. Cl.
*B22F 3/10* (2006.01)
*B33Y 10/00* (2015.01)
*B33Y 30/00* (2015.01)
*B33Y 80/00* (2015.01)
*B33Y 40/20* (2020.01)
*B33Y 70/10* (2020.01)

(52) U.S. Cl.
CPC ............... *B33Y 40/20* (2020.01); *B33Y 70/10* (2020.01); *B33Y 80/00* (2014.12); *B64G 1/58* (2013.01)

(58) Field of Classification Search
CPC ......... B33Y 30/00; B33Y 40/20; B33Y 70/10; B33Y 80/00; B64G 1/58; B64G 1/226; C22C 1/0433; C22C 19/00; Y02P 10/25
See application file for complete search history.

(56) References Cited

U.S. PATENT DOCUMENTS

| | | | |
|---|---|---|---|
| 7,602,679 | B2 | 10/2009 | Ohta et al. |
| 9,815,118 | B1 | 11/2017 | Schmitt et al. |
| 10,562,226 | B1 | 2/2020 | Cohen et al. |
| 10,857,730 | B1 | 12/2020 | Cohen et al. |
| 11,014,162 | B2* | 5/2021 | Hofmann ............... B22F 10/25 |
| 11,045,912 | B2 | 6/2021 | Alahyari et al. |
| 11,122,706 | B2 | 9/2021 | Jeffers |
| 11,529,685 | B2* | 12/2022 | Kritchman ............. B22F 10/43 |
| 2005/0145374 | A1 | 7/2005 | Dussinger et al. |
| 2014/0008374 | A1 | 1/2014 | Lubart et al. |
| 2015/0064047 | A1 | 3/2015 | Hyde et al. |
| 2015/0080495 | A1 | 3/2015 | Heikkila |
| 2016/0177829 | A1 | 6/2016 | Loebig et al. |
| 2016/0214176 | A1* | 7/2016 | Bruck ................... B22F 3/1125 |
| 2017/0102194 | A1 | 4/2017 | Choi et al. |
| 2018/0172369 | A1 | 6/2018 | Rhoden et al. |
| 2018/0281283 | A1 | 10/2018 | Frechman et al. |
| 2018/0339342 | A1* | 11/2018 | Hofmann ............... C22C 1/0458 |
| 2019/0077715 | A1* | 3/2019 | Alessi ........................ C09J 5/06 |
| 2019/0110357 | A1 | 4/2019 | Gavagnin et al. |
| 2019/0178585 | A1 | 6/2019 | de Bock et al. |
| 2019/0217525 | A1 | 6/2019 | Mark et al. |
| 2019/0387643 | A1 | 12/2019 | Jeffers |
| 2020/0047252 | A1* | 2/2020 | Kritchman .......... B28B 17/0081 |
| 2020/0248014 | A1 | 8/2020 | Rougher et al. |
| 2020/0316684 | A1* | 10/2020 | Shuck ................... B29C 64/264 |
| 2020/0398385 | A1 | 12/2020 | Alahyari et al. |
| 2021/0307202 | A1 | 9/2021 | Abate et al. |

OTHER PUBLICATIONS

U.S. Appl. No. 17/098,019, filed Nov. 13, 2020, by Shuck et al.
Hacopian et al., "Technical Challenges with 3D Printing Heat Shields," NASA Slideshow, Aug. 28, 2018, 11 pp.
Mulholland et al., "Design and Additive Manufacturing of a Composite Crossflow Heat Exchanger," Solid Freeform Fabrication 2017: Proceedings of the 28th Annual International Solid Freeform Fabrication Symposium, Aug. 2017, 9 pp.
Ameli et al., "Advanced 3D Printed Heat Pipes for space applications," Heat Exchanger Action Group (HEXAG) meeting, Thermacore Europe, May 22, 2013, 37 pp.
"Standard Heat Pipes," Retrieved from https://myheatsinks.com/heat-pipe-solutions/standard-heat-pipes/ on Oct. 24, 2019, 6 pp.
Jafari et al., "Metal 3D-Printed Wick Structures for Heat Pipe Application: Capillary Performance Analysis," Applied Thermal Engineering, vol. 143, Jul. 22, 2018, pp. 403-414.
Norfolk et al., "3D Printing Dissimilar Metals Improves Thermal Performance," fabrisonic.com, Sep. 5, 2018, 4 pp.
Mulholland et al., "Filled Thermoconductive Plastics for Fused Filament Fabrication," Solid Freeform Fabrication 2016: Proceedings of the 27th Annual International Solid Freeform Fabrication Symposium, Aug. 2016, 14 pp.
Iftikhar, "Fabrisonic's 3D Metal Printed Heat Exchanger Gets Green-Light From NASA," 3dprintingindustry.com, Aug. 13, 2018, 4 pp.

* cited by examiner

FUSED FILAMENT FABRICATION OF THERMAL MANAGEMENT ARTICLE

This application claims the benefit of U.S. Provisional Patent Application No. 62/935,531, titled, "FUSED FILAMENT FABRICATION OF THERMAL MANAGEMENT ARTICLE", filed Nov. 14, 2019, which is incorporated herein by reference in its entirety.

TECHNICAL FIELD

The disclosure relates to additive manufacturing techniques, in particular, to additive manufacturing of thermal management articles such as heat or energy shields.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

The disclosure describes example techniques, systems, materials, and compositions for additively manufacturing thermal management articles including a thermal coating using fused filament fabrication (FFF). The thermal coating may function as a heat or energy shield, e.g., for entry of a vehicle from space into an atmosphere or for protection against directed energy devices, by protecting an underlying substrate from energy absorbed and/or reflected by the thermal coating.

The details of one or more examples are set forth in the accompanying drawings and the description below. Other features, objects, and advantages will be apparent from the description and drawings, and from the claims.

DETAILED DESCRIPTION

The disclosure generally describes techniques for forming additively manufactured components, such as thermal management articles, using fused filament fabrication (FFF). Additive manufacturing of metal, alloy, or ceramic components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys and ceramics may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys or ceramics may also result in components that may be prone to cracking due to localized melting and thermal gradients.

In some examples, a material including a sacrificial binder and a powder including metal, alloy, ceramic, and/or other material dispersed in the binder may be deposited using FFF to form an additively manufactured component. After additively forming one or more layers of the component, or after forming the entire component, the binder may be selectively removed or sacrificed from the layers or the component, for example, using heating, chemical dissolution, or the like. Sacrificing the binder from the layers or the component may leave substantially only the powder in the layers or the component. The component may be further treated, for example, by sintering, to strengthen or densify the powder and form the additively manufactured component. By using the material including the sacrificial binder and the powder, removing the sacrificial binder, and sintering the powder, high-melt temperature alloys and ceramics may be used, residual (free) powder may be reduced, and crack propensity may be reduced due to the absence of melting. Further, microstructure of the additively manufactured component may be more carefully controlled by controlling microstructure of the powder and avoiding melting of the powder during processing.

As noted above, in some examples, the disclosure relates to the additive manufacturing of thermal management articles using a FFF process. The thermal management articles may include a thermal coating formed on a substrate, where the thermal coating is formed by a FFF process. The thermal coating may function as a heat or energy shield, e.g., for entry of a vehicle from space into an atmosphere or for protection against directed energy devices, by protecting an underlying substrate, e.g., from energy absorbed by the thermal coating. The thermal coating may be formed by an FFF process in which a filament having a powder in a binder is deposited onto the substrate. The binder is sacrificed and the powder is sintered to form the thermal coating.

The thermal coating formed by the FFF process may have a variety of properties that cause the coating to protect the underlying substrate from energy directed at the coating, e.g., through the surface of the coating opposite the substrate. The directed energy may be reflected and/or distributed throughout the article by the thermal coating to prevent undesirable heating of the underlying substrate. In some examples, the thermal management coating may have a relatively low thermal conductivity, e.g., to reduce the amount of heat conducted through the coating into the underlying substrate. Additionally, or alternatively, the thermal management coating may have a relatively high radiant emittance to re-radiate absorbed energy. Additionally, or alternatively, the thermal management coating may have a relatively low or high thermal diffusivity, e.g., in the direction of the underlying substrate. The thermal coating may be configured to reduce the amount of energy transferred to the underlying substrate, e.g., by transferring the energy away from the underlying substrate.

In some examples, the thermal coating may be an ablative thermal coating that is configured to ablate in response to absorption of energy (e.g., thermal energy or radiant energy). For example, in the case of an ablative thermal coating, the coating may be configured to ablate in response to absorption of radiant, convective, or other energy from an external environment. The thermal coating may be ablated through melting, vaporization, sublimation, and/or erosion of the thermal coating material resulting from the energy absorbed from an external environment. The ablation of the material of the thermal coating may reduce the amount of energy that is absorbed by the thermal coating and transferred to the underlying substrate from the external environment.

The use of a FFF process may allow for thermal coatings to be produced from a variety of materials, such as metal, alloys, ceramics, and the like, without melting the materials during the additive manufacturing process as may be the case with a powder bed fusion process. In some examples, two or more dissimilar materials may be used to form the thermal coating using the FFF process, e.g., to allow for properties of the thermal coating to tailored, even in cases in which the dissimilar materials are generally not compatible to be melted to each other. In the case of FFF processes, dissimilar material may be relatively easy to print, de-bind, and sinter from a filament having a powder with the dissimilar materials compared to other additive manufacturing techniques.

Additionally, in the case of ablative thermal coatings or other consumable thermal coatings, replacement thermal coatings may be additively manufactured onto a substrate as needed using a FFF process. In some examples, a modular system may be used, e.g., where a plurality of individual tiles form an overall heat or energy shield, and individual replacement tiles may be readily manufactured as needed to replace damaged or ablated tiles without replacing the entire modular system.

In one example, thermal management articles described herein may be used as thermal plating for protection against directed energy devices (e.g., high energy lasers) or aerodynamic friction (e.g., as reentry heat shields for a space vehicle). The thermal plating may include a sacrificial ablative surface coating that absorbs and/or reflects thermal energy (or other types of energy) to safeguard underlying components or vehicles. A FFF produced plate or other article may have the sacrificial coating built into the component and the coating may be readily replaceable in the field due to its ease of production.

Figure 1:
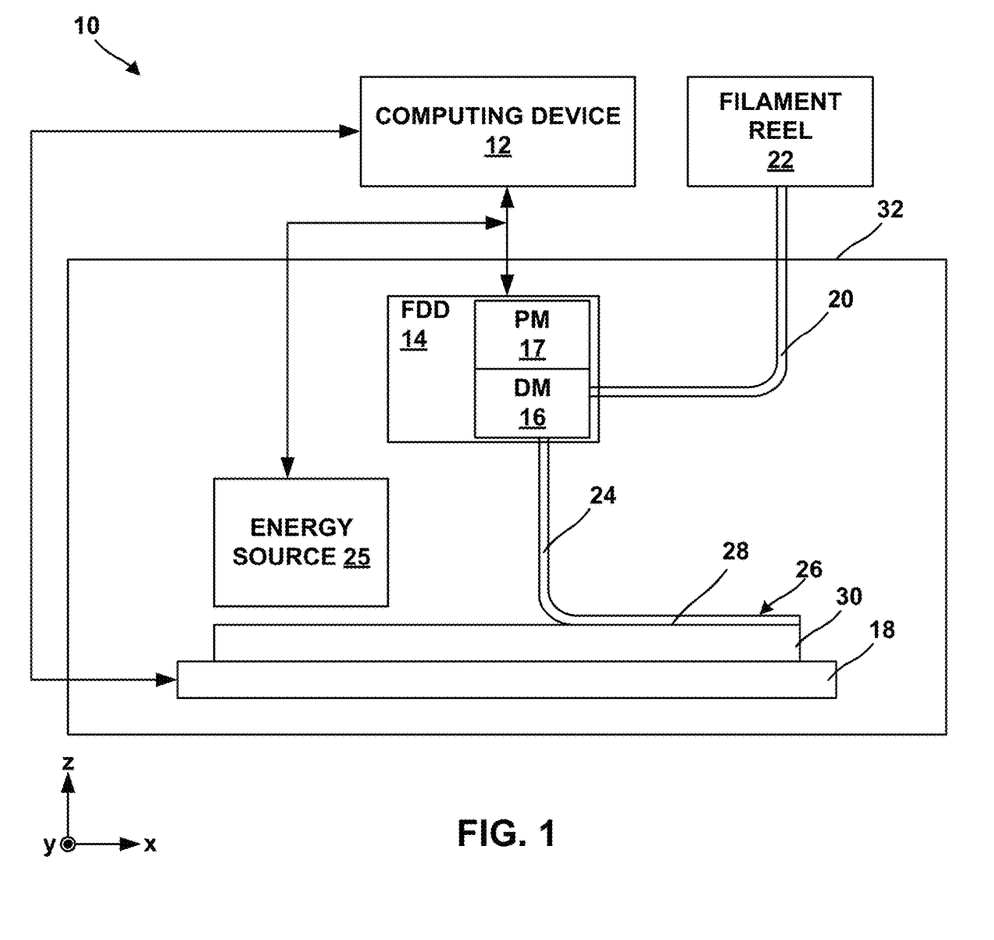
FIG. 1 is a conceptual block diagram illustrating an example system for forming an additively manufactured component by fused filament fabrication of a material including a metal or alloy powder and a binder.

FIG. 1 is a conceptual block diagram illustrating an example fused filament fabrication system 10 for performing fused filament fabrication to form an additively manufactured component including a powder and a binder by filament delivery. Additive manufacturing system 10 may include computing device 12, filament delivery device 14, enclosure 32, and stage 18.

Figure 2:
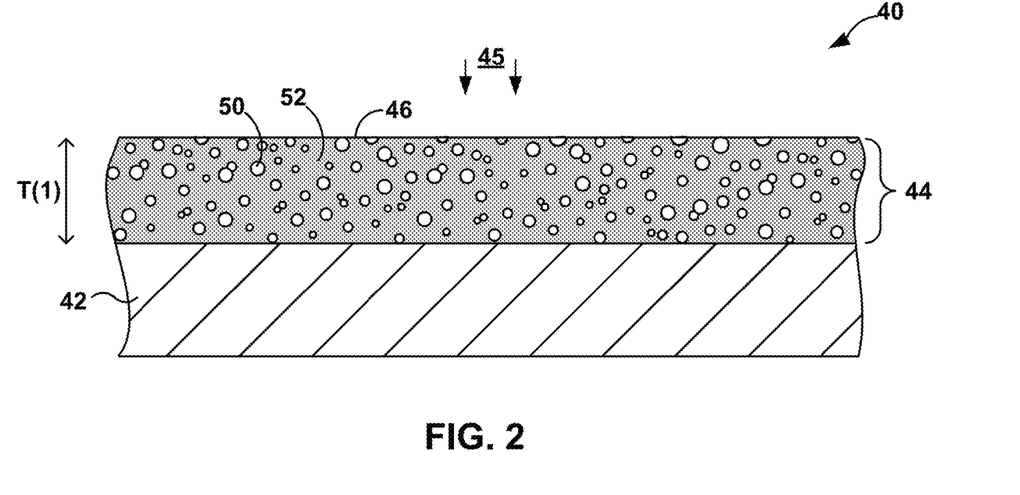
FIG. 2 is a conceptual schematic diagram of an example thermal management article.

As described further below, system 10 is an example of a system that may be used to make a thermal management article according to the disclosure. For example, system 10 may be used to additively manufacture a thermal coating such as thermal coating 44 of thermal management article 40 in FIG. 2A.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the powder, such as a metal or alloy powder and/or a ceramic powder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, in some examples, each filament may include a powder and a binder configured to bind the metal or alloy powder in filament 20. In some examples, the powder may include a metal or alloy powder, a ceramic powder, a powder including a metal or alloy and a ceramic, or the like.

The metal or alloy powder may include any suitable metal or alloy for forming an additively manufactured component. In some examples, the metal or alloy powder include a high-performance metal or alloy for forming component used in mechanical systems, such as a steel (e.g., stainless steel), a nickel-based alloy, a cobalt-based alloy, a titanium-based alloy, or the like. In some examples, the metal or alloy powder may include one or more refractory metals or refractory metal alloy such as, e.g., Ti, V, Cr, Mn, Zr, Nb, Mo, Tc, Ru, Rh, Hf, Ta, W, Re, Os, and Ir. Refractory metals may be used for vacuum insulators, e.g., in hypersonic and space applications that may require high temperature capabilities. Refractory metals may have a high melting temperature making them undesirable, impractical or not useable in a powder bed fusion process. In some examples, the refractory metal or refractory metal alloy such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof. In some examples, the metal or alloy powder may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the metal or alloy powder may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi. In some examples of the disclosure, a material that is highly reflective of thermal radiation may be used to form one or more layers. Examples of highly reflective materials may include gold, silver, aluminum, and copper, which may be highly reflective in the infrared.

In some examples, in addition to a metal or alloy powder, the powder may include a ceramic, such as an oxide. For example, the powder may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

In some examples, the powder of filament 20 may include a ceramic powder, e.g., as an alternative to a metal or alloy powder. For example, the powder of filament 20 may include a ceramic, such as a nitride, carbide, or oxide, or carbon. Ceramic may be an alternative to or an addition to metal powder to form a composite with improved heat resistance and wear resistance. Example ceramics may include alumina, zirconia and magnesium oxide. Other suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples, the ceramic functions as a reinforcement material in a final component formed from the filament. The primary material thus may include continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like, within filament 20. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Filament 20 also includes a sacrificial binder. The sacrificial binder may include a polymeric material, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. The metal or alloy powder may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filaments 24 are extruded and/or after softened filaments 24 are laid down in roads 26 to form a material including the metal or alloy powder dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, energy source 25 may direct energy at a curable polymer precursor, for example, in the material, to selectively cure the curable polymer precursor to form roads 26 including the material that includes the metal or alloy powder and the sacrificial binder. In other examples, the heat to which the composition is exposed to form softened filaments 24 may initiate the curing reaction, and no additional energy source is used.

In some examples, filament 20 includes a selected amount of sacrificial binder and metal or alloy powder so that the material in roads 26 may include more than about 80% by volume of the powder, which may result in a substantially rigid component with reduced porosity being formed in response to removal of the sacrificial binder. In some examples, filament 20 includes sacrificial binder in an amount configured to cause the material to shrink by less than about 20 volume percent relative to an initial volume of the material in response to removing the sacrificial binder. For example, filament 20 may include less than about 20% by volume of the sacrificial binder.

In some examples, filament 20 includes at least one shrink-resistant agent. For example, the at least one shrink-resistant agent may include a ceramic, instead of, or in addition to, the oxide in any ODS present in the material(s).

In some examples, the ratio of binder to powder in filament 20 may be tailored to provide for a relatively porous thermal coating after the binder has been sacrificed and the powder sintered. A porous thermal coating may transfer a relatively small amount of heat to an underlying substrate from an external environment compared to a relatively dense or non-porous coating, thus providing beneficial heat shielding properties in some cases. In some examples, filament 20 includes less than about 80% by volume of the powder, such as, e.g., less than about 66% by volume, such as about 20% to about 50% by volume.

FIG. 2 is a schematic diagram illustrating an example thermal management article 40 in accordance with examples of the disclosure. Thermal management article 40 includes substrate 42 and thermal coating 44 on the surface of substrate 42. Thermal coating 44 may function to reduce the amount of energy absorbed by coating 44 from external environment 45 that is transferred to substrate 40. The energy from external environment 45 absorbed by thermal coating 44 may be thermal energy, radiant energy, electromagnetic energy, or other types of energy. Thermal coating 44 may reflect energy from external environment 45 (e.g., by refraction and/or diffraction). In some examples, the energy from external environment 45 may be associated with entry of a space vehicle into an atmosphere from space (e.g., reentry into earth's atmosphere from space) or energy from a directed energy device (e.g., electromagnetic energy from a laser or other directed energy device).

In some examples, the energy from external environment 45 absorbed by coating 44, e.g., through surface 46, may heat thermal coating 44. To shield or otherwise protect underlying substrate 42, thermal coating 44 may function to reduce the amount of the energy, e.g., in the form of heat, transferred into substrate 42 from coating 44. For example, thermal coating 44 may have a relatively high emissivity to radiate absorbed energy from external environment 45 back into external environment 45. Additionally, or alternatively, thermal coating 44 may disperse the energy across coating 44 and/or substrate 42, e.g., to prevent localized areas of heating substrate 42. Additionally, or alternatively, thermal coating 44 may have a relatively low thermal conductivity, e.g., to reduce the amount of heat conducted through coating 44 into underlying substrate 44. In some examples, thermal coating 44 may be configured to maintain substrate 44 at a temperature less than the melting temperature of one or more components of substrate 44 by shielding substrate 42 from external environment 45. In some examples, to shield or otherwise protect underlying substrate 42, thermal coating 44 may function to reflect energy.

Furthermore, as will be described below, in some examples, thermal coating 44 may be configured to ablate in response to absorption of energy (e.g., thermal energy or radiant energy). For example, coating 44 may be configured to ablate in response to absorption of radiant, convective, or other energy from external environment 45. Thermal coating 44 may be ablated through melting, vaporization, sublimation, and/or erosion of the thermal coating, and/or other mechanism resulting from the energy absorbed from an external environment. The ablation process may reduce the amount of energy that is absorbed by thermal coating 44 and transferred to underlying substrate 42 from external environment 45, e.g., by consuming energy through the vaporization, sublimation and/or melting of coating 44.

Substrate 42 may be a portion of system that may be subject to external environment 45. In some examples, substrate 42 may be a component in a vehicle. The vehicle may operate in space and enter an atmosphere from space. In such an example, thermal management article 40 may be a component of the heat shield of the vehicle. In some examples, the vehicle may be an aircraft, or a wheeled or tracked vehicle, e.g., that may be exposed at times to relatively high amounts of energy from an external environment, such as that described herein. In such an example, thermal management article 40 may be a component that provides protection against directed energy weapons that uses electromagnetic energy such as a laser. In some examples, thermal management article 40 may be employed to as heat shield in an engine compartment or hypersonic skins.

Substrate 42 may include a material suitable for use in a high-temperature environment. In some examples, substrate 42 includes a superalloy including, for example, an alloy based on Ni, Co, Ni/Fe, or the like. In examples in which substrate 42 includes a superalloy material, substrate 112 may also include one or more additives such as titanium (Ti), cobalt (Co), or aluminum (Al), which may improve the mechanical properties of substrate 112 including, for example, toughness, hardness, temperature stability, corrosion resistance, oxidation resistance, or the like.

In some examples, substrate 42 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 112 includes a ceramic, the ceramic may be substantially homogeneous.

In examples in which substrate 42 includes a CMC, substrate 42 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

As illustrated in FIG. 2, coating 44 of article 40 is on substrate 42. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 2, coating 44 of article 40 may be directly on substrate 42. In other examples, one or more coatings or layers of a coating may be between coating 44 and substrate 42.

Thermal coating 42 may have any suitable composition. As described herein, the composition of thermal coating 42 may depend on the composition of the filament, such as filament 24, deposited by a filament deposition device as part of a FFF process. For example, the powder of the filament may determine the overall composition of thermal coating 42. The composition of coating 44 may determine the properties of coating 44 described herein.

In some examples, thermal coating 44 is formed by depositing a powder in filament 24, including the example powder materials described above. Example metal or alloy powders include those described herein. Additionally, or alternatively, thermal coating 44 may be formed with a ceramic powder. Example ceramic powders include those described herein. In some examples, dissimilar materials may be used to form coating 44. In some examples, filament 24 may contain powders of the dissimilar materials within the same volume of the binder when filament 24 is deposited. Additionally, or alternatively, the composition of filament 24 may change during FFF process to provide for different volumes within the overall volume of coating 44 having different compositions.

The composition of coating 44 may be substantially uniform or may vary, e.g., in the thickness T(1) direction or a direction substantially orthogonal to the thickness direction. In some examples, coating 44 may be compositionally graded to tailor the heat or energy shielding properties of coating 44. The compositional gradient may be achieved by varying the composition of powder within filament 24 during the FFF process as described above.

As shown in FIG. 2, coating 44 may be a porous coating having pores such as pore 50 that define void spaces in the material 52 of coating 44. Coating may have a relatively high porosity, e.g., to reduce the thermal conductivity of coating 42 to reduce heat transfer from surface 46 of coating 44 to substrate 42. Porosity may refer to the percentage of void space in coating 44 relative to the overall volume of coating 44. The porosity of coating 44 may be substantially continuous through the thickness T(1) of coating or there may a gradient in the thickness direction (e.g., with portion of coating 44 nearest surface 46 being more porous than the portion nearer substrate 42 or vice versa).

The porosity of coating 44 may be tailored based on the FFF process used to form coating 44. For example, there may be relatively high-volume percentage of binder in filament 24 relative to the powder so that the powder material remaining after the binder is sacrificed is relatively porous for the volume of the deposited filament or after sintering of the powder. In some examples, the volume percent of binder in filament 24 may vary to provide for a porosity gradient within coating 44.

In some examples, the porosity of coating 44 may a result from how filament 24 is laid up or otherwise deposited during the FFF process. For example, filament 24 may be deposited in a pseudorandom layout (e.g., like a rat's nest) to achieve a relatively high porosity.

In some examples, coating 44 may additionally or alternatively have a relatively high emissivity, e.g., to radiate energy from external environment 45.

In some examples, coating 44 may additionally or alternatively have a relatively high reflectivity, e.g., to reflect energy from external environment 45. In some example, coating 44 reflects energy from external environment by refraction and/or diffraction.

Coating 44 may additionally or alternatively have a relatively low thermal conductivity. The thermal conductivity of coating 44 may be dependent on the porosity of coating 44 and/or the types of material 52 of coating 44, e.g., the powder in filament 24 that is deposited and sintered during a FFF process. Example powders that may have relatively low thermal conductivity when used to form coating 44 include, e.g., a ceramic powder. The thermal conductivity of coating 44 may be substantially continuous through the thickness T(1) of coating or there may a gradient in the thickness direction (e.g., with portion of coating 44 nearest surface 46 being more thermally conductive than the portion nearer substrate 42 or vice versa).

In some examples, coating 44 may additionally or alternatively have a relatively low diffusivity, e.g., to diffusive the energy from external environment 45 at a relatively slow rate through the thickness T(1) into substrate 42. The thermal diffusivity may be dependent on the type of material 52 for coating 44 (e.g., based on the specific heat capacity and thermal conductivity of the material) and density of coating 44 and/or material 52. The thermal diffusivity of coating 44 may be substantially continuous through the thickness T(1) of coating or there may a gradient in the thickness direction (e.g., with portion of coating 44 nearest surface 46 being more thermally diffusive than the portion nearer substrate 42 or vice versa).

Coating 44 may have any suitable thickness T(1). The thickness T(1) of coating 44 may be selected based on variety of factors including, e.g., the amount of energy absorbed into surface 46 of coating 44 from external environment 45, as well as the other properties of coating 44. In the case of an ablative sacrificial coating, describe further below, thickness T(1) may be selected such that coating 44 includes a sufficient volume of material to be ablated for a desired amount of energy absorbed from external environment, e.g., while keeping the energy (heat) transferred into substrate 42 below a desired threshold.

In some examples, coating 44 may protect substrate 42 from energy incident on coating 44 from external environment 45 without ablating coating 44, e.g., so that the thickness T(1) remains substantially constant throughout the operation of article 40 in external environment 45 while shielding or otherwise protecting substrate 42 from energy absorbed from external environment 45. Conversely, as noted above, in some examples, thermal coating 44 of thermal management article 40 functions as an ablative sacrificial coating.

Figure 3:
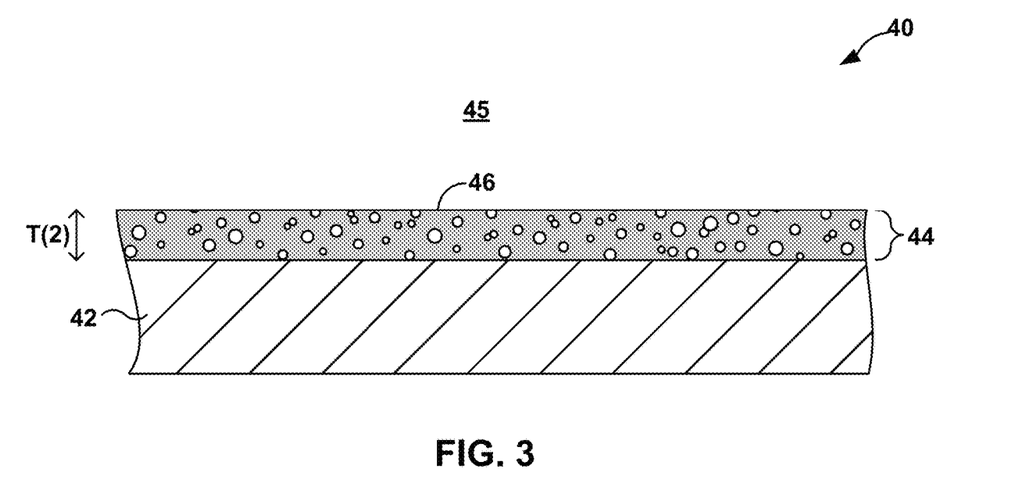
FIG. 3 is a conceptual schematic diagram of the example thermal management article of FIG. 2 following ablation of the thermal coating.

FIG. 3 is a schematic diagram illustrating thermal management article 40 after thermal coating 44 has been ablated, e.g., as a result of absorption of energy from an external environment through surface. As shown, thickness T(2) of coating 44 has decreased as a result of the ablation process. The ablation may be the result of melting, sublimation, vaporization, and/or the like of at least a portion of coating 44 (e.g., starting with the material at surface 46 of coating 44 and moving into the thickness of coating 44 as the ablation process proceeds). In some examples, depending on the material composition of coating 44, the ablation of coating 44 may include pyrolysis of the coating material. The energy for the ablation of the material of coating 44 may be energy absorbed by coating 44 from external environment 45. The ablation of the coating material may consume at least a portion of the absorbed energy from external environment that may otherwise be transferred into the underlying substrate 42.

The thickness T(2) of coating 44 after being ablated may be less than thickness T(1). In some examples, thickness T(2) may be approximately zero, e.g., where all or a portion of coating 44 has been ablated from the surface of substrate 42 as a result of energy absorbed from external environment 45.

In some examples, coating 44 may be replaced following ablation. In the case where coating 44 is not completely ablated from substrate 42, the remaining coating may be removed, e.g. via a machining process, and a replacement coating may be formed on the surface of substrate 42 using a FFF process like that used to form the original coating. Alternatively, the entire thermal management article 40 may be replaced with another article having the same structure. In some examples, thermal management article 40 may be a single tile in a plurality of tiles that together form a larger heat shield, e.g., for a space vehicle or other type of vehicle. Following ablation of coating 44, the tile may be replaced as described along with other tiles in which the thermal coating has been ablated, e.g., following re-entry or entry into an atmosphere from space or exposure to electromagnetic energy from a directed energy device.

Figure 4A:
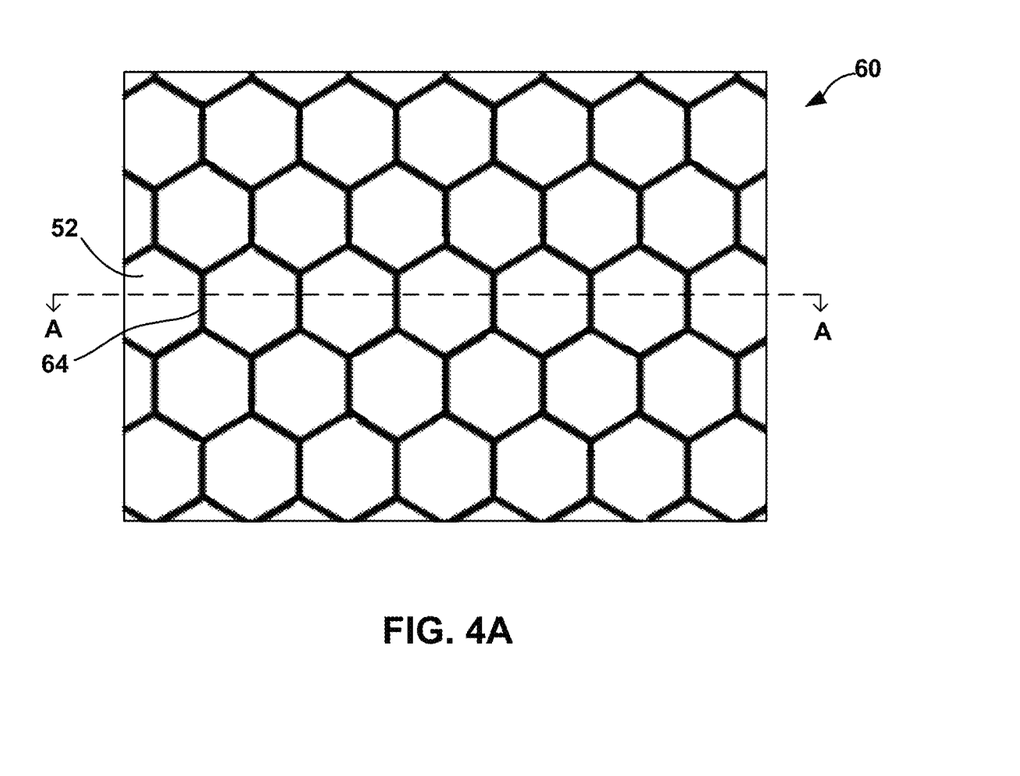
FIGS. 4A and 4B are conceptual schematic diagrams of another example thermal management article.
Figure 4B:
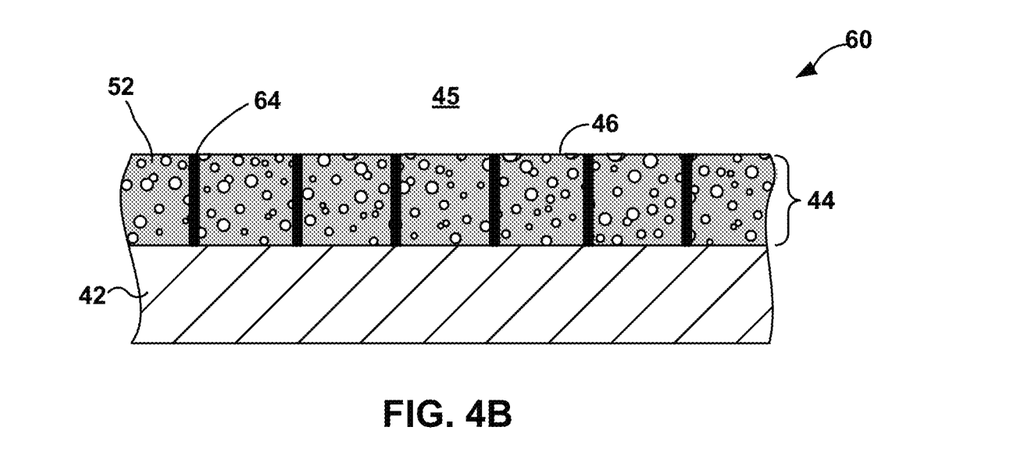

FIG. 4A is a schematic diagram illustrating another example thermal management article 60. FIG. 4B is a schematic diagram illustrating thermal management article 60 along cross-section A-A in FIG. 4A. Thermal management article 60 may be similar to thermal management article 40 of FIGS. 2 and 3 in some respects, and similar features are similarly numbered. For example, substrate 42 of article 60 may be the same or substantially similar to that of substrate 42 of article 40 in FIGS. 2 and 3.

Similarly, thermal coating 44 of article 60 may be the same or substantially similar to coating 44 of article 40 in FIGS. 2 and 3. For example, the properties and material 52 of coating 44 in article 60 may be the same or similar to that described above with regard to article 40. However, coating 44 of article 60 includes reinforcement structure 64 that structurally reinforces material 52 of coating 44. For example, reinforcement structure 64 may divide material 52 of coating 44 into smaller cells of material 52 within coating 44. This may be beneficial for bonding material 52 to substrate 42 in cases in which material 52 coating 44 has a relatively high porosity and/or other properties which may inhibit the bonding of coating 44 to substrate 42. Additionally, or alternatively, the use of reinforcement structure 64 may prevent erosion of material 52 from coating 44 (e.g., in cases where coating experiences relatively high rates of fluid flow over surface 46 of coating 44 from external environment 45, e.g., during entry of a vehicle into an atmosphere).

As shown in FIG. 4A, reinforcement structure 64 has a honeycomb structure although other geometries are contemplated for dividing material 52 into smaller cells. As shown in FIG. 4B, reinforcement structure 64 extends from surface 46 of coating 44 to substrate 42 through material 52. Any suitable material may be used for reinforcement structure 64. In some examples, reinforcement structure 64 may have different properties and may be formed of a different material than material 52 located within reinforcement structure 64. For example, reinforcement structure 64 may have a lower porosity or higher density than that of material 52 to provide a relatively rigid structure for reinforcing material 52 of coating 44. Like that of the remainder of coating 44, reinforcement structure 64 may be formed by a FFF process.

Figure 5:
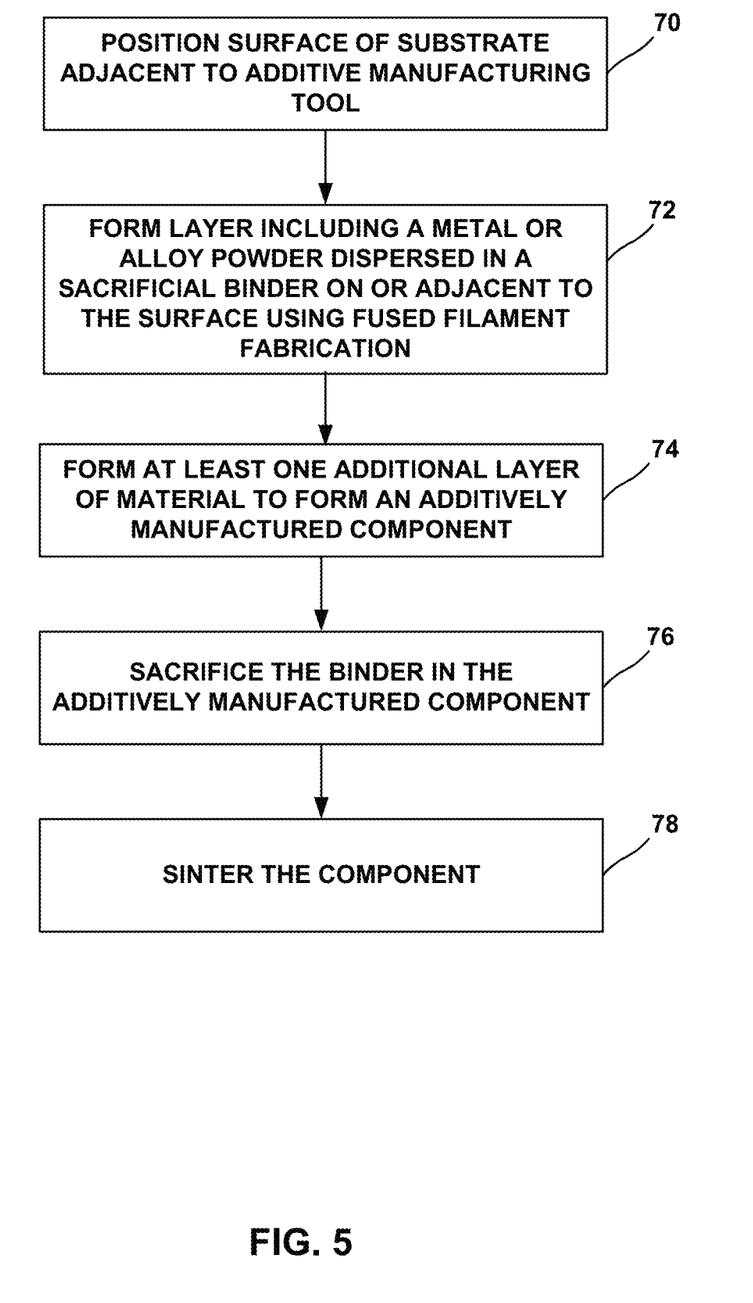
FIG. 5 is a flow diagram illustrating an example technique for forming an additively manufactured component using fused filament fabrication.

An example technique that may be implemented by system 10 will be described with concurrent reference to FIG. 5. FIG. 5 is a flow diagram illustrating an example technique for forming an additively manufactured component, such as article 40 or article 60 including at least one feature smaller than a base resolution of the additive manufacturing technique. Although the technique of FIG. 5 is described with respect to system 10 of FIG. 1, in other examples, the technique of FIG. 5 may be performed by other systems, such a system 30 including fewer or more components than those illustrated in FIG. 1. Similarly, system 10 may be used to performed other additive manufacturing techniques. The example technique of FIG. 5 may be used to form a thermal coating on the surface of a component such as those described herein. For example, the example technique of FIG. 5 may be employed to form thermal coating 44 of article 40 of FIGS. 2 and 3, and thermal coating 44 of article 60 of FIGS. 4A and 4B.

The technique of FIG. 5 includes positioning substrate 30 including surface 28 adjacent to a build position, e.g., on stage 18 (70). In some examples, system 10 may not include a separate substrate 30, the technique of FIG. 5 may include positioning a build surface defined by stage 18, or by another component, or layers of prior softened filament 24 or another material.

The technique of FIG. 5 also includes forming a road 26 of material using fused filament fabrication (72). Computing device 12 may cause filament delivery device 14 to deposit softened filament 24 in one or more roads 26 to ultimately form the additively manufactured component. A plurality of roads 26 defining a common plane may define a layer of material. Thus, successive roads 26 may define a series of layers, for example, parallel layers, and the series of layers may eventually define the additively manufactured component.

The technique of FIG. 5 also includes forming, on roads 26 of material, at least one additional layer of material to form an additively manufactured component (74). For example, computing device 12 may control movement and positioning of filament delivery device 14 relative to stage 18, and vice versa, to control the locations at which roads are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component (74).

The technique of FIG. 6 includes, after forming the additively manufacturing component (74), sacrificing the binder from the component (76). The sacrificing (76) may include delivering thermal or any suitable energy, for example, by energy source 25, to roads 24 in an amount sufficient to cause binder to be substantially oxidized, incinerated, carbonized, charred, decomposed, or removed from roads 24, while leaving the metal or alloy powder substantially intact. In other examples, the additively manufactured component may be placed in a furnace to heat the additively manufactured component and cause removal of the binder from the component (76).

The technique of FIG. 5 also includes, after sacrificing the binder (76), sintering the component (78). The sintering may include a thermal treatment, for example, one or more predetermined cycles of exposure to predetermined temperatures for predetermined times. In some examples, energy source 25 may deliver energy to cause sintering. In other examples, the additively manufactured component may be placed in a furnace to heat the additively manufactured component and cause sintering. In some examples, the sintering (78) may promote the bonding of particles of powder to each other to strengthen the component including substantially only the powder after the binder is sacrificed. Sintering may not melt the particles of powder, thus leaving the microstructure of the particles substantially intact. This may facilitate forming components with selected microstructures compared to techniques that include melting the powder. The sintering (78) may also densify an interior or a surface region of the component, for example, by promoting powder compaction and reducing porosity. In some examples, the steps of removing the sacrificial binder (76) and sintering the component (78) may be combined in a single heating step or series of heating steps, e.g., within a furnace.

Figure 6:
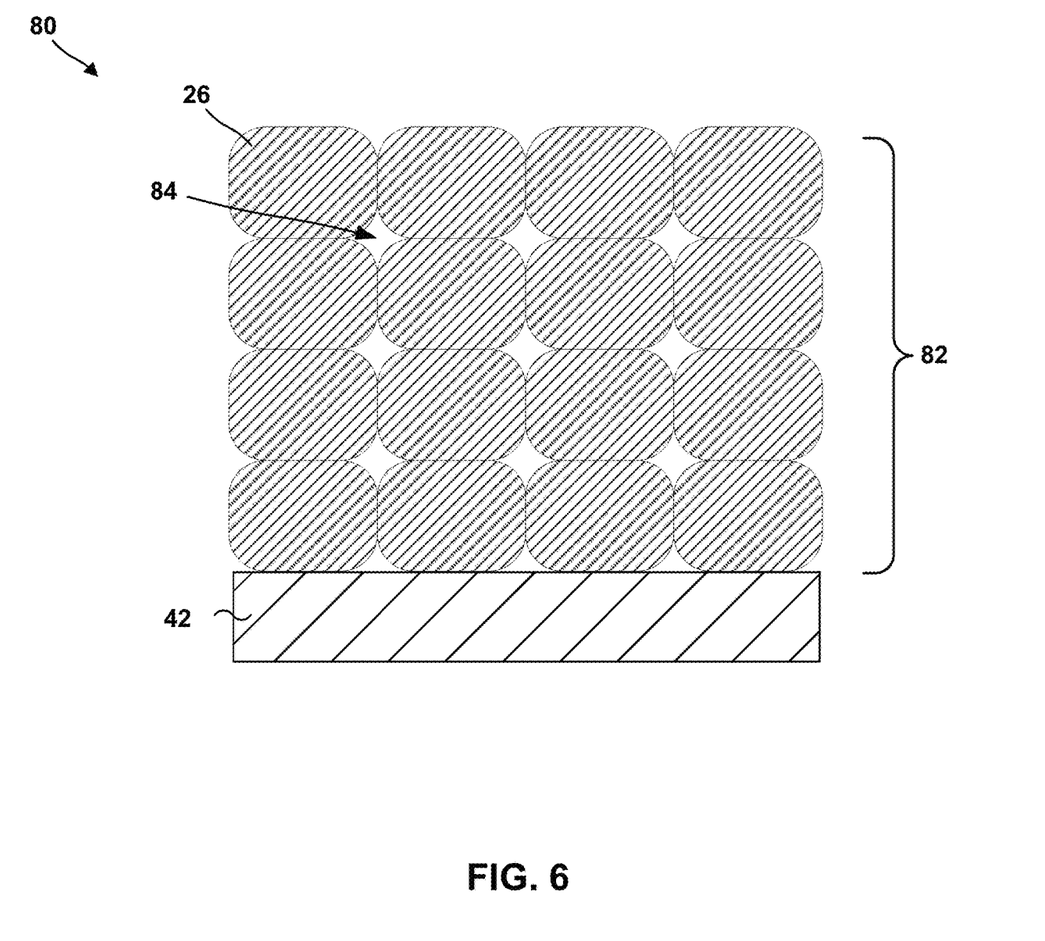
FIG. 6 is a conceptual schematic diagram of a composite coating formed by a FFF process prior to sacrificing a binder and sintering a powder from a filament.

FIG. 6 is a schematic diagram illustrating a cross-sectional view an example article 80 including a composite coating 82 on substrate 42. Composite coating 82 may correspond to thermal coating 44 describe previously made by a FFF process such as that described in FIG. 5 but prior to the sacrificing of the binder from filament 24 and sintering the powder of filament 24. Put another way, thermal coating 44 may be formed from composite coating 82 once composite coating 82 is processed to sacrifice the binder from coating 82 and sinter the powder from coating 82. Substrate 42 may be the same or substantially similar to that of substrate 42 of articles 40 and 60.

As shown in FIG. 6, composite coating 82 is formed by depositing filament 24 to forms roads 26 that may be arranged adjacent to each other, e.g., in a four by four array of columns and rows like that shown. Channels 84 in coating 82 may be present in areas where the filament material of roads 26 are not in contact with each other. In some examples, channels 84 may be removed after sintering of the powders in road 82.

Alternatively, composite coating 82 may be configured such that a void space remains in the areas of channels 84 after sintering to define at least part of the porosity of thermal coating 44. In this manner, the porosity of thermal coating 44 may be increased compared to examples in which channels 84 do not remain after composite coating is sintered. As noted above, it may be beneficial in some examples for thermal coating to have a relatively high porosity, and the design of channels 84 to result in void spaces in thermal coating 44 after sintering may allow for another way to increase the overall porosity of thermal coating 44. The porosity of thermal coating 44 may be derived from sacrificing the binder in each road 26 to leave powder. As the volume percentage of binder within road 26 increases, the porosity of the remaining powder in road 26 may increase, thus increasing the porosity of thermal coating 44 once the powder of road 26 is sintered.

As noted above, one or more properties of thermal coating 40 may be substantially uniform or nonuniform within coating 40. To define a gradient for a property, such as porosity, thermal conductivity, thermal diffusivity, and/or emissivity, of thermal coating 40, the composition or other properties of the individual roads 26 in composite coating 82 may be varied. For example, during the FFF process of FIG. 5, the composition of the powder and/or amount of binder in filament 24 may vary such that the composition and/or amount of binder for the individual roads 26 show in FIG. 6 varies. The variance may be used to tailor the properties of thermal coating 44 as described herein. For example, the bottom two rows of roads 26 may have a different powder composition and/or different amount of binder compared to the top two rows of roads 26 in composite coating 82 so that the properties of thermal coating 44 are different near surface 46 of thermal coating 44 compared to nearer substrate 42 after sacrificing the binder and sintering the powder of composite coating 82. In this way, using a FFF process to form thermal coating 44 may be beneficial, e.g., as compared to other technique for forming a thermal coating.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following clauses and claims.

Clause 1. A method comprising: forming an as-deposited coating on a substrate by depositing a filament via a filament delivery device, wherein the filament includes a sacrificial binder and a powder; removing substantially all the binder from the as-deposited coating; and sintering the as-deposited coating to form a thermal coating; wherein the thermal coating is configured to ablate in response to absorption of energy from an external environment, and wherein the ablation of the thermal coating reduces the energy transferred to the substrate.

Clause 2. The method of clause 1, wherein the powder comprises a metal or alloy powder.

Clause 3. The method of clause 1 or 2, wherein the powder comprises two or more of a metal, alloy, or ceramic powder.

Clause 4. The method of any one of clauses 1-3, wherein the absorbed energy from the external environment includes at least one of radiant energy or thermal energy from the external environment.

Clause 5. The method of any one of clauses 1-4, wherein the ablation of the thermal coating reduces transfer of heat from the external environment through the thermal coating to the substrate to maintain the substrate at a temperature below a melting temperature of the substrate.

Clause 6. The method of any one of clauses 1-5, further comprising arranging the thermal coating as a heat shield on a space vehicle to shield a portion of the space vehicle during entry into an atmosphere.

Clause 7. The method of any one of clauses 1-6, further comprising arranging the thermal coating as a heat shield on a vehicle to shield a portion of the vehicle from electromagnetic energy from a directed energy device.

Clause 8. An additive manufacturing system comprising a substrate defining a major surface; a filament delivery device; and a computing device configured to control the filament delivery device to depositing a filament via a filament delivery device to form an as-deposited coating on a substrate, wherein the filament includes a sacrificial binder and a powder, wherein the binder is configured to be removed from the as-deposited coating and the powder is configured to be sintered to form a thermal coating on the substrate, wherein the thermal coating is configured to ablate in response to absorption of energy from an external environment, and wherein the ablation of the thermal coating reduces the energy transferred to the substrate.

Clause 9. The system of clause 8, wherein the powder comprises a metal or alloy powder.

Clause 10. The system of clause 8 or 9, wherein the powder comprises two or more of a metal, alloy, or ceramic powder.

Clause 11. The system of any one of clauses 8-10, wherein the absorbed energy from the external environment includes at least one of radiant energy or thermal energy from the external environment.

Clause 12. The system of any one of clauses 8-11, wherein the ablation of the thermal coating reduces transfer of heat from the external environment through the thermal coating to the substrate to maintain the substrate at a temperature below a melting temperature of the substrate.

Clause 13. The system of any one of clauses 8-12, wherein the thermal coating is configured to be arranged as a heat shield on a space vehicle to shield a portion of the space vehicle during entry into an atmosphere.

Clause 14. The system of any one of clauses 8-13, wherein the thermal coating is configured to be arranged as a heat shield on a vehicle to shield a portion of the vehicle from electromagnetic energy from a directed energy device.

Clause 15. A fused filament fabricated ballistic armor article including a thermal coating formed from a filament including a powder and a binder, wherein the thermal coating is configured to ablate in response to absorption of energy from an external environment, and wherein the ablation of the thermal coating reduces the energy transferred to the substrate.

Clause 16. The article of clause 15, wherein the powder comprises a metal or alloy powder.

Clause 17. The article of clause 15 or 16, wherein the powder comprises two or more of a metal, alloy, or ceramic powder.

Clause 18. The article of any one of clauses 15-17, wherein the absorbed energy from the external environment includes at least one of radiant energy or thermal energy from the external environment.

Clause 19. The article of any one of clauses 15-18, wherein the ablation of the thermal coating reduces transfer of heat from the external environment through the thermal coating to the substrate to maintain the substrate at a temperature below a melting temperature of the substrate.

Clause 20. The article of any one of clauses 15-19, further comprising arranging the thermal coating as a heat shield on a space vehicle to shield a portion of the space vehicle during entry into an atmosphere.

Clause 21. The article of any one of clauses 15-20, wherein the thermal coating as a heat shield on a vehicle to shield a portion of the vehicle from electromagnetic energy from a directed energy device.

Clause 22. A method comprising forming an as-deposited coating on a substrate by depositing a filament via a filament delivery device, wherein the filament includes a sacrificial binder and a powder; removing the binder from the as-deposited coating; and sintering the as-deposited coating to form a thermal coating, wherein the thermal coating is configured to reduce energy transferred to the substrate from an external environment.

Clause 23. The method of clause 22, wherein the thermal coating is configured to at least one of absorb the energy from the external environment or reflect the thermal energy from the environment to reduce the energy transferred to the substrate from an external environment.

Clause 24. The method of clauses 22 or 23, wherein the powder comprises a metal or alloy powder.

Clause 25. The method of any one of clauses 22-24, wherein the powder comprises two or more of a metal, alloy, or ceramic powder.

Clause 26. The method of any one of clauses 22-25, wherein the absorbed energy from the external environment includes at least one of radiant energy or thermal energy from the external environment.

Clause 27. The method of any one of clauses 22-26, wherein the thermal coating is configured to ablate to reduce energy transferred to the substrate, wherein the ablation of the thermal coating reduces transfer of heat from the external environment through the thermal coating to the substrate to maintain the substrate at a temperature below a melting temperature of the substrate.

Clause 28. The method of any one of clauses 22-27, further comprising arranging the thermal coating as a heat shield on a space vehicle to shield a portion of the space vehicle during entry into an atmosphere.

Clause 29. The method of any one of clauses 22-28, further comprising arranging the thermal coating as a heat shield on a vehicle to shield a portion of the vehicle from electromagnetic energy from a directed energy device.

Clause 30. An additive manufacturing system comprising a substrate defining a major surface; a filament delivery device; and a computing device configured to control the filament delivery device to depositing a filament via a filament delivery device to form an as-deposited coating on a substrate, wherein the filament includes a sacrificial binder and a powder, wherein the binder is configured to be removed from the as-deposited coating and the powder is configured to be sintered to form a thermal coating on the substrate, wherein the thermal coating is configured to reduce energy transferred to the substrate from an external environment.

Clause 31. The system of clause 30, wherein the thermal coating is configured to at least one of absorb the energy from the external environment or reflect the thermal energy from the environment to reduce the energy transferred to the substrate from an external environment.

Clause 32. The system of clauses 30 or 31, wherein the powder comprises a metal or alloy powder.

Clause 33. The system of any one of clauses 30-32, wherein the powder comprises two or more of a metal, alloy, or ceramic powder.

Clause 34. The system of any one of clauses 30-33, wherein the absorbed energy from the external environment includes at least one of radiant energy or thermal energy from the external environment.

Clause 35. The system of any one of clauses 30-34, wherein the thermal coating is configured to ablate to reduce energy transferred to the substrate, wherein the ablation of the thermal coating reduces transfer of heat from the external environment through the thermal coating to the substrate to maintain the substrate at a temperature below a melting temperature of the substrate.

Clause 36. The system of any one of clauses 30-35, wherein the thermal coating is configured to be arranged as a heat shield on a space vehicle to shield a portion of the space vehicle during entry into an atmosphere.

Clause 37. The system of any one of clauses 30-36, wherein the thermal coating is configured to be arranged as a heat shield on a vehicle to shield a portion of the vehicle from electromagnetic energy from a directed energy device.

Clause 38. A fused filament fabricated ballistic armor article including a thermal coating formed from a filament including a powder and a binder, wherein the thermal coating is configured to reduce energy transferred to the substrate from an external environment.

Clause 39. The article of clause 38, wherein the thermal coating is configured to at least one of absorb the energy from the external environment or reflect the thermal energy from the environment to reduce the energy transferred to the substrate from an external environment.

Clause 40. The article of clauses 38 or 39, wherein the powder comprises a metal or alloy powder.

Clause 41. The article of any one of clauses 38-40, wherein the powder comprises two or more of a metal, alloy, or ceramic powder.

Clause 42. The article of any one of clauses 38-41, wherein the absorbed energy from the external environment includes at least one of radiant energy or thermal energy from the external environment.

Clause 43. The article of any one of clauses 38-42, wherein the thermal coating is configured to ablate to reduce energy transferred to the substrate, wherein the ablation of the thermal coating reduces transfer of heat from the external environment through the thermal coating to the substrate to maintain the substrate at a temperature below a melting temperature of the substrate.

Clause 44. The article of any one of clauses 38-43, further comprising arranging the thermal coating as a heat shield on a space vehicle to shield a portion of the space vehicle during entry into an atmosphere.

Clause 45. The article of any one of clauses 38-44, further comprising arranging the thermal coating as a heat shield on a vehicle to shield a portion of the vehicle from electromagnetic energy from a directed energy device.

What is claimed is:

1. A method comprising:
   forming an as-deposited coating on a substrate by depositing a filament via a filament delivery device, wherein the filament includes a sacrificial binder and a powder;
   removing substantially all the binder from the as-deposited coating; and
   sintering the as-deposited coating to form a thermal coating; wherein the thermal coating is configured to ablate in response to absorption of energy from an external environment, wherein the ablation of the thermal coating reduces the energy transferred to the substrate, and wherein the ablation of the thermal coating reduces transfer of heat from the external environment through the thermal coating to the substrate to maintain the substrate at a temperature below a melting temperature of the substrate.

2. The method of claim 1, wherein the powder comprises a metal or alloy powder.

3. The method of claim 1, wherein the powder comprises two or more of a metal, alloy, or ceramic powder.

4. The method of claim 1, wherein the absorbed energy from the external environment includes at least one of radiant energy or thermal energy from the external environment.

5. The method of claim 1, further comprising arranging the thermal coating as a heat shield on a space vehicle to shield a portion of the space vehicle during entry into an atmosphere.

6. The method of claim 1, further comprising arranging the thermal coating as a heat shield on a vehicle to shield a portion of the vehicle from electromagnetic energy from a directed energy device.

* * * * *